(12) United States Patent
Itami

(10) Patent No.: US 7,679,801 B2
(45) Date of Patent: Mar. 16, 2010

(54) OPTICAL DEFLECTOR, METHOD OF MANUFACTURING OPTICAL DEFLECTOR, OPTICAL SCANNING APPARATUS, AND IMAGE FORMING APPARATUS

(75) Inventor: Yukio Itami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 231 days.

(21) Appl. No.: 11/851,544

(22) Filed: Sep. 7, 2007

(65) Prior Publication Data

US 2008/0239432 A1    Oct. 2, 2008

(30) Foreign Application Priority Data

Sep. 14, 2006    (JP)    ............... 2006-250048

(51) Int. Cl.
*G02B 26/08*    (2006.01)
(52) U.S. Cl. .................................. 359/203.1
(58) Field of Classification Search ............. 359/203.1, 359/216.1, 219.1, 218.1
See application file for complete search history.

(56) References Cited

U.S. PATENT DOCUMENTS

| | | | | |
|---|---|---|---|---|
| 5,867,298 | A | * | 2/1999 | Harrigan et al. .......... 359/201.1 |
| 6,023,059 | A | * | 2/2000 | Blanding .................. 250/234 |
| 7,126,737 | B2 | | 10/2006 | Atsuumi et al. |
| 7,145,705 | B2 | * | 12/2006 | Hayashi ................... 359/204.1 |
| 7,215,454 | B2 | * | 5/2007 | Paul et al. ................ 359/216.1 |
| 2004/0051771 | A1 | * | 3/2004 | Eom et al. ................ 347/134 |
| 2006/0061847 | A1 | | 3/2006 | Itami |
| 2006/0208179 | A1 | | 9/2006 | Itami |
| 2007/0146852 | A1 | | 6/2007 | Itami |
| 2007/0153349 | A1 | | 7/2007 | Itami et al. |

FOREIGN PATENT DOCUMENTS

| | | |
|---|---|---|
| JP | 8-146330 | 6/1996 |
| JP | 9-96711 | 4/1997 |
| JP | 2000-233334 | 8/2000 |
| JP | 2002-267988 | 9/2002 |
| JP | 2003-315720 | 11/2003 |
| JP | 3489370 | 11/2003 |
| JP | 2005-92129 | 4/2005 |

* cited by examiner

*Primary Examiner*—Euncha P Cherry
(74) *Attorney, Agent, or Firm*—Oblon, Spivak, McClelland, Maier & Neustadt, L.L.P.

(57) ABSTRACT

An optical deflector is disclosed that includes a rotary shaft; plural rotary polygon mirrors laminated in an axis direction of the rotary shaft, the rotary polygon mirrors having reflection surfaces and the reflection surfaces of one rotary polygon mirror and those of another rotary polygon mirror facing in different directions; and a joining section provided between the rotary polygon mirrors. In the optical deflector, the joining section is integrally formed with at least one of the rotary polygon mirrors.

12 Claims, 14 Drawing Sheets

OPTICAL DEFLECTOR, METHOD OF MANUFACTURING OPTICAL DEFLECTOR, OPTICAL SCANNING APPARATUS, AND IMAGE FORMING APPARATUS

BACKGROUND OF THE INVENTION

1. Field of the Invention

The present invention relates to an optical deflector, a method of manufacturing the optical deflector, an optical scanning apparatus, and an image forming apparatus.

2. Description of the Related Art

Recent electrophotographic image forming apparatuses such as copiers, laser beam printers, and facsimile apparatuses convert electronic information into optical information, fix the optical information on a photoreceptor as latent images with an optical scanning apparatus, and develop the fixed latent images by toner or the like to form images. The optical scanning apparatus is composed of an optical system including a laser optical source, a cylindrical lens, a rotary polygon mirror, an image forming lens, a mirror, and the like. In the optical scanning apparatus, the laser beam from the laser optical source is formed into a luminous flux by the cylindrical lens, deflected for scanning by the rotary polygon mirror, and the deflected optical light is formed into images on the photoreceptor by the image forming lens, the mirror, and the like to form electrostatic latent images. In recent years and continuing to the present, such image forming apparatuses have achieved high speed and high density, and the rotation speed of the rotary polygon mirror of the optical scanning apparatus also has been greatly increased. Among the image forming apparatuses, color image forming machines generally need four colors to form images and optical scanning for each color. Therefore, the ones equipped with plural rotary polygon mirrors are used. Generally, the plural rotary polygon mirrors are laminated one on the other and fixed onto a rotary shaft to coaxially rotate, and are structured in such a manner as to reflect different incident lights at different positions to perform an optical scanning. Furthermore, in order to correspond to the high density in addition to the high speed of the image forming apparatuses, the tendency has been toward an increase in the rotational speed and the area of the reflection surface of the rotary polygon mirror. An increase in the rotational speed and the surface area of the rotary polygon mirror would inevitably cause vibrations, noise, increased wind noise due to the friction with ambient air, or a temperature rise due to an eccentricity or the like of the rotary polygon mirror.

In order to solve the problem of wind noise, in particular, there have been disclosed many documents. In Patent Document 1, for example, there is proposed an apparatus in which the surroundings of the rotary polygon mirror are covered, a transparent member is disposed at the area through which an optical beam passes, and an end of the transparent member is positioned at an inner wall surface near an opening edge on the downstream side in the rotating direction of the rotary polygon mirror. Accordingly, the apparatus prevents airflow, occurring when the rotary polygon mirror is rotated, from colliding against the inner wall surface near the opening edge on the downstream side in the rotating direction and the occurrence of turbulent flow caused by the collision to maintain laminar flow, thereby reducing the occurrence of noise. Patent Document 2 discloses an apparatus in which the reflection surfaces of first and second rotary polygon mirrors are shifted from each other in the rotating direction to allow reduction of wind noise. Patent Document 3 discloses an apparatus in which a protrusion is provided near the doorway of a deflector cover where an optical beam goes in and out. Accordingly, the apparatus generates the disturbance in an air flow to prevent the occurrence of the so-called whistle noise. Patent Document 4 discloses an apparatus in which an adhesive is applied to a concave portion for adjusting balance so as to correspond to the high-speed rotation of the rotary polygon mirror, thereby preventing the noise caused by the high-speed rotation. Patent Document 5 discloses improvement in a method of molding a resinous rotary polygon mirror, thereby preventing irregular rotation at the high-speed rotation and noise. Patent Document 6 discloses an optical deflector for a color image forming apparatus in which plural polygon mirrors are laminated in the rotary shaft direction and fixed together with deflection reflective surfaces of the polygon mirrors of each stage shifted from the others by a prescribed angle in the rotating direction.

In the above optical deflector, a rotating body is manufactured in such a manner that the plural rotary polygon mirrors are laminated one on the other and fitted on the rotary shaft to be assembled. In this case, it is necessary to use a highly accurate manufacturing technique to precisely adjust and fix the reflection surfaces of the plural rotary polygon mirrors by a prescribed angle to balance the rotating body to reduce vibrations or noise caused by the deflection surfaces at high-speed rotation. Moreover, there is a possibility of the reflection surfaces of the plural rotary polygon mirrors being shifted from each other due to acceleration and heat stress caused by their high-speed rotation or stopping operations.

Patent Document 1: JP-A-8-146330
Patent Document 2: JP-A-2003-315720
Patent Document 3: JP-B2-3489370
Patent Document 4: JP-A-2002-267988
Patent Document 5: JP-A-9-96711
Patent Document 6: JP-A-2005-92129

The present invention was made in view of the above problems and may provide a high-speed-and-high-density-ready optical deflector in which plural rotary polygon mirrors are firmly joined to each other and by which no rotational fluctuations are produced even at high-speed rotation, and a shift in position of the rotary polygon mirrors hardly takes place due to acceleration and temperature change; a method of manufacturing the optical deflector; an optical scanning apparatus using the optical deflector; and an image forming apparatus.

SUMMARY OF THE INVENTION

After extensive studies to solve the above problems, the present inventor has come to the idea of fixing plural rotary polygon mirrors through a joining section to be integrally formed with each other and has completed the present invention based on the findings. A description is made below of units of the present invention for solving the problems of the related art.

A first invention provides an optical deflector. The optical deflector comprises a rotary shaft; plural rotary polygon mirrors laminated in an axis direction of the rotary shaft, the rotary polygon mirrors having reflection surfaces and the reflection surfaces of one rotary polygon mirror and those of another rotary polygon mirror facing in different directions; and a joining section provided between the rotary polygon mirrors. In the optical deflector, the joining section is integrally formed with at least one of the rotary polygon mirrors.

A second invention provides the optical deflector according to claim 1. The optical deflector comprises the rotary shaft; the plural rotary polygon mirrors laminated in the axis direction of the rotary shaft, the rotary polygon mirrors having the reflection surfaces and the reflection surfaces of one rotary polygon mirror and those of another rotary polygon mirror facing in different directions; and the joining section provided between the rotary polygon mirrors. In the optical deflector, the reflection surfaces are formed by mirror-machining after the rotary shaft and the rotary polygon mirrors are integrated with each other.

A third invention provides the optical deflector according to claim 1, wherein the rotary polygon mirrors are forged products.

A fourth invention provides the optical deflector according to claim 1, wherein the rotary polygon mirrors are shrink-fitted on the rotary shaft.

A fifth invention provides an optical deflector. The optical deflector comprises a rotary shaft; plural rotary polygon mirrors having reflection surfaces, the reflection surfaces of one rotary polygon mirror and those of another rotary polygon mirror facing in different directions; and a joining section provided between the rotary polygon mirrors. In the optical deflector, the rotary polygon mirrors and the joining section are formed as an integrated rotating body and fixed to the rotary shaft.

A sixth invention provides the optical deflector according to claim 1, wherein the rotary shaft includes a rotor-magnet holding section in which a rotor magnet is arranged.

A seventh invention provides the optical deflector according to claim 1, wherein the joining section has the shape of a cylinder having an axis parallel to the rotary shaft, and the outer diameter of the cylinder is smaller than or equal to the diameter of an inscribed circle with respect to the shape of a cross section of the rotary polygon mirrors at their surfaces perpendicular to the rotary shaft.

An eighth invention provides an image forming apparatus that optically scans a photosensitive surface of a photoreceptor with an optical scanning apparatus to have a latent image formed thereon and visualizes the latent image to form an image. In the image forming apparatus, the photosensitive surface of the photoreceptor is optically scanned to form latent image with the optical scanning apparatus comprising an optical-beam emitting unit; the optical deflector according to claim 1; a dividing optical system that divides an optical beam emitted from the optical-beam emitting unit into plural optical beams to be incident on plural polygon mirrors of the optical deflector, the optical beams being reflected as plural reflected lights from the plural polygon mirrors; and a scanning optical system that makes the plural reflected lights reflected from the rotary polygon mirrors be formed into images on plural of the photoreceptors.

According to the first through seventh inventions, there may be provided a high-speed-and-high-density-ready optical deflector in which plural rotary polygon mirrors are firmly joined to each other and by which no rotational fluctuations are produced even at high-speed rotation and a shift in position of the rotary polygon mirrors hardly takes place due to acceleration and temperature change.

According to the eighth invention, there may be provided a high-speed-and-high-density-ready image forming apparatus.

DETAILED DESCRIPTION OF THE PREFERRED EMBODIMENTS

First, referring to the accompanying drawings, a description is made of three types of preferred embodiments relating to an optical deflector and a method of manufacturing the optical deflector.

First Embodiment

Figure 1:
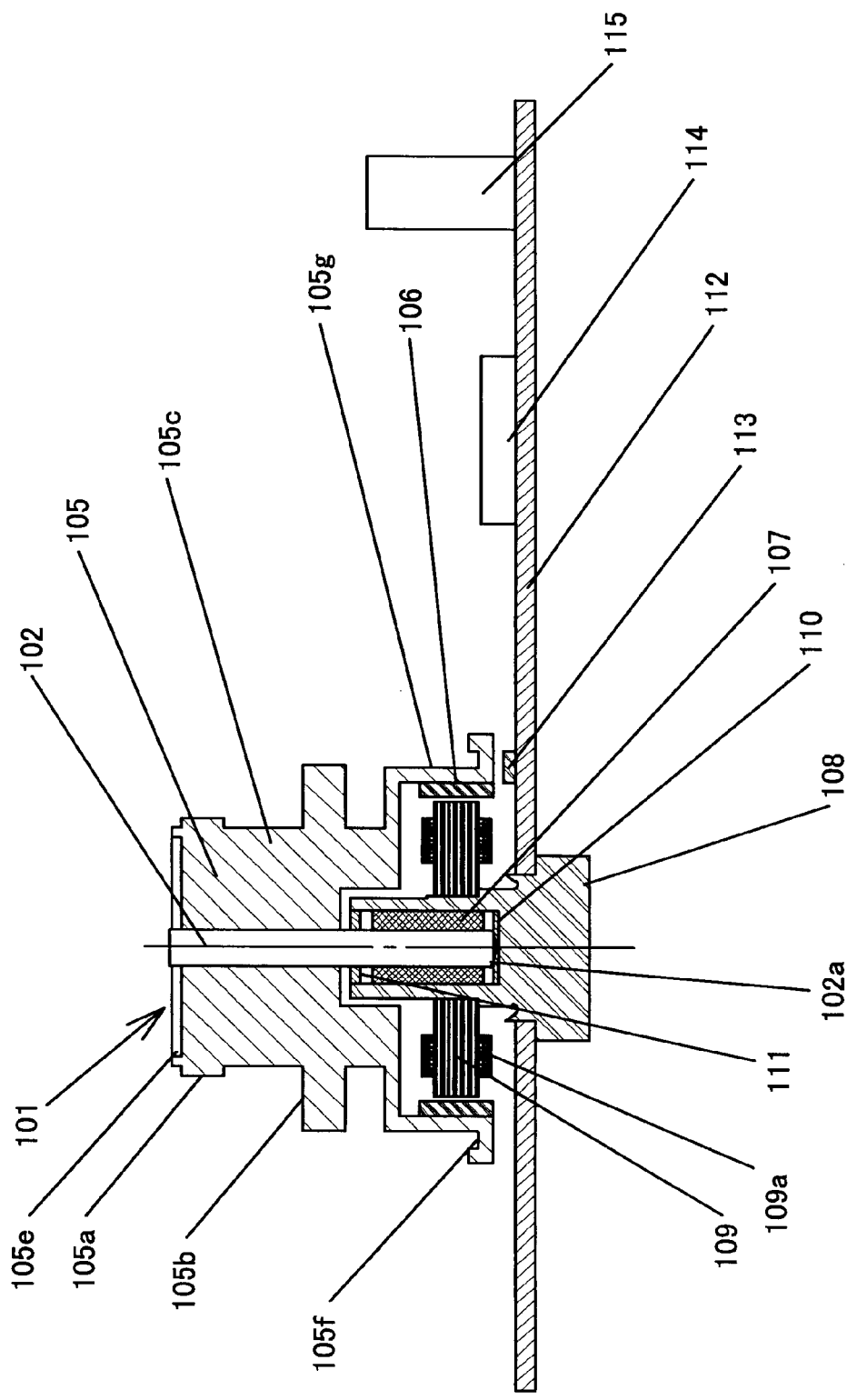
FIG. 1 is a cross-sectional view of an optical deflector according to a first embodiment of the present invention.
Figure 2:
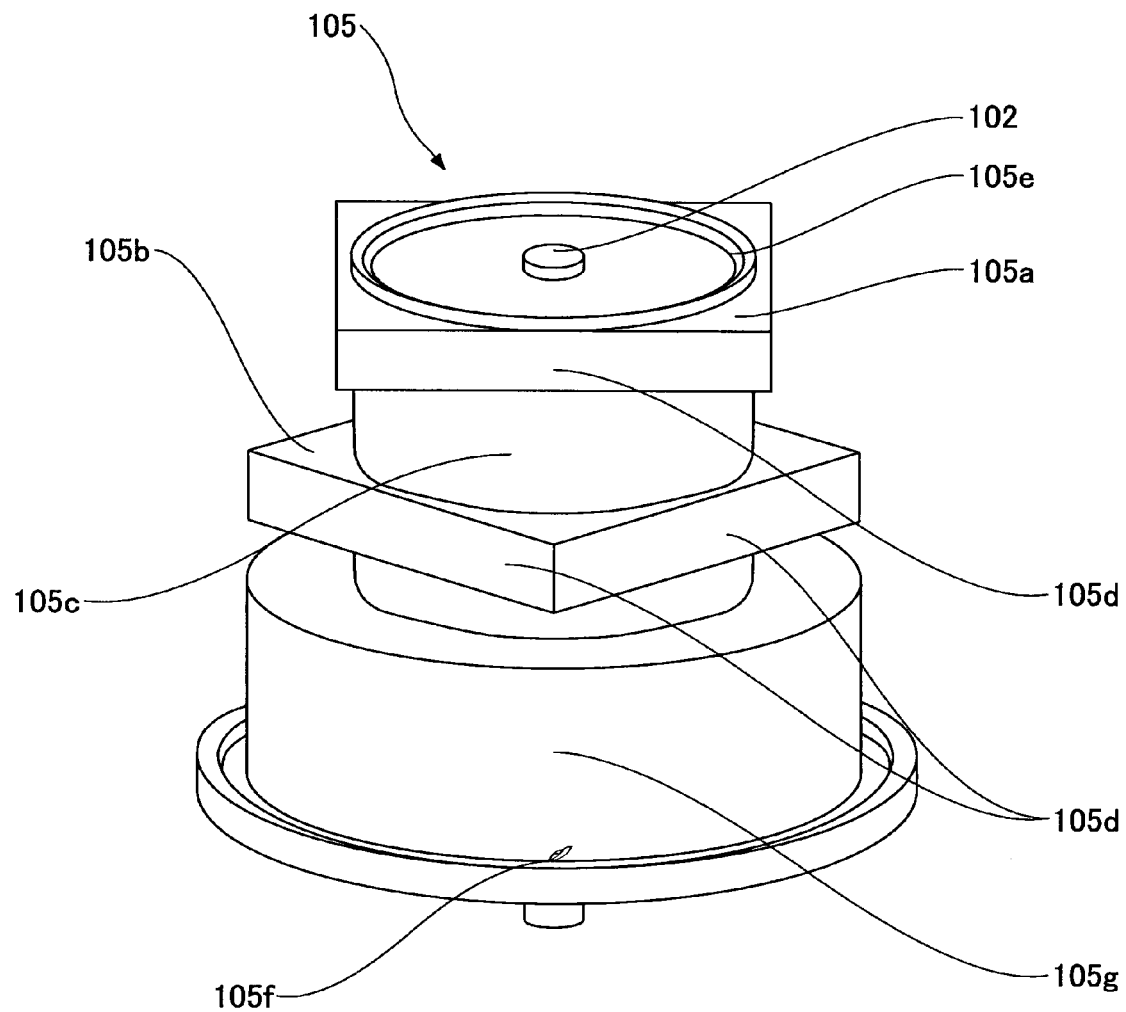
FIG. 2 is a perspective view of the optical deflector according to the first embodiment of the present invention.

FIGS. 1 and 2 are a cross-sectional view and a perspective view of the optical deflector of first and second embodiments of the present invention, respectively. The optical deflector 100 includes a rotating body 101 and a motor provided underneath the rotating body 101. The rotating body 101 is composed of a bearing shaft 102 as a rotary shaft, a mirror rotor 105 fixed about the bearing shaft 102, and a rotor magnet 106 serving also as a part of the motor. Two rotary polygon mirrors 105a and 105b and a joining section 105c are integrated with each other to form the mirror rotor 105.

In this embodiment, the upper rotary polygon mirror 105a of the mirror rotor 105 has four reflection surfaces, and the adjacent reflection surfaces are shifted from each other by 90 degrees in the rotating direction. Similarly, the rotary polygon mirror 105b has four reflection surfaces, and the adjacent reflection surfaces are shifted from each other by 90 degrees in the rotating direction. The rotary polygon mirror 105b is laminated under the rotary polygon mirror 105a through the joining section 105c. The reflection surfaces 105d of the upper and lower rotary polygon mirrors 105a and 105b are formed such that they are shifted from each other by 45 degrees in the rotating direction. The joining section 105c is preferably formed into a cylindrical shape. The rotary polygon mirrors 105a and 105b, the joining section 105c, and a holding section 105g for the rotor magnet 106 are preferably configured to form one mirror rotor 105 as an integrated rotating body and shrink-fitted on the bearing shaft 102. Accordingly, it is possible to firmly fix the bearing shaft 102 and the mirror rotor 105 together and prevent a shift in position and a fluctuation of the rotary polygon mirrors 105a and 105b due to high-speed rotation. Note that the inside of the mirror rotor 105 is cut off to form an indent such that a bearing housing 108 is easily arranged.

The mirror rotor 105 is preferably formed of an aluminum-based metal material. Furthermore, the mirror rotor 105 including the rotary polygon mirrors 105a and 105b is preferably manufactured with high dimensional precision, resistant to high-speed rotation, and is a forged part having sufficient strength so as to be firmly fixed on the bearing shaft 102.

Figure 3:
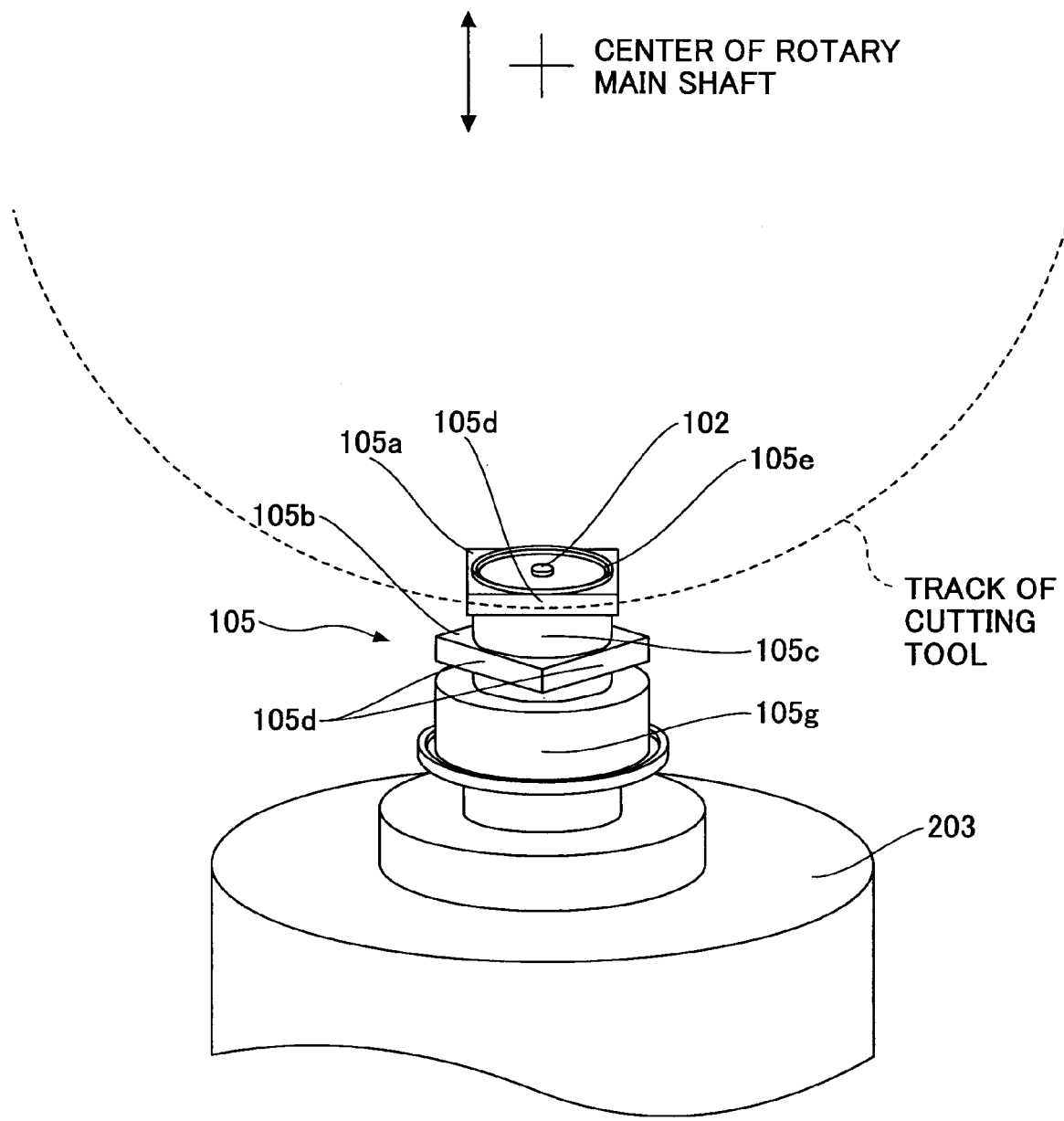
FIG. 3 is the perspective view of the optical deflector for describing mirror-machining on deflection reflective surfaces.
Figure 4:
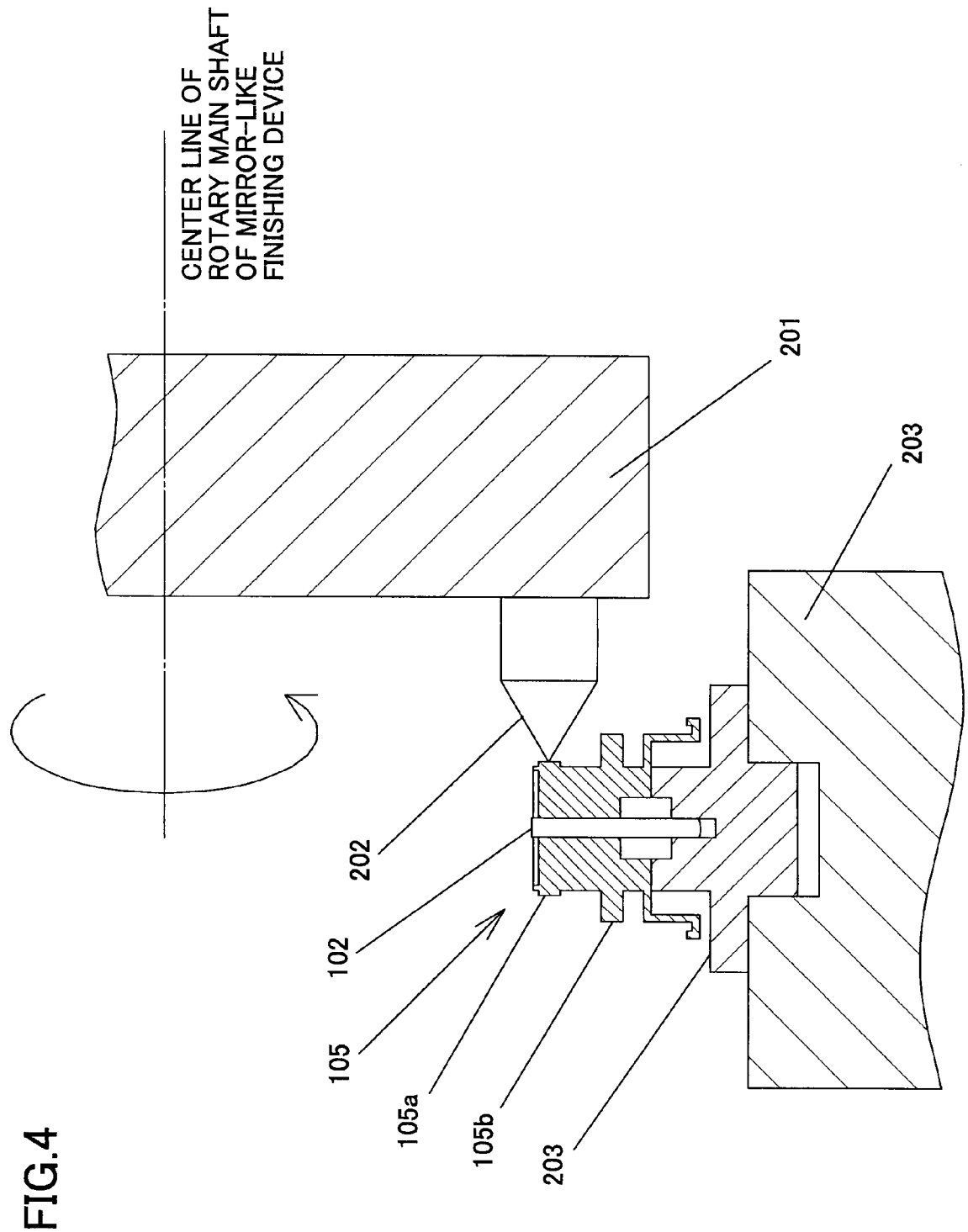
FIG. 4 is a cross-sectional view of the optical deflector for describing mirror-machining on deflection reflective surfaces.

Between the rotary polygon mirrors 105a and 105b is provided the joining section 105c as a predetermined interval to perform mirror-machining on the reflection surfaces 105d of the rotary polygon mirrors 105a and 105b where the rotary polygon mirrors 105a and 105b are integrated with each other in the mirror rotor 105. FIGS. 3 and 4 show a front perspective view and a side view, respectively, for describing mirror-machining on the reflection mirrors 105d. A mirror-machining device for use is schematically shown to depict only a main part relating to a cutting operation. A disk-shaped member 201 is fixed to a rotary main shaft of the mirror-machining device, and a cutting tool 202 for mirror-machining is attached on the outer circumferential side of an end surface of the disk-shaped member 201. The mirror-machining device is arranged such that the central axis of the rotary main shaft is orthogonal to that of the bearing shaft 102 of the to-be-cut rotating body 101. The rotary main shaft of the mirror-machining device is rotated to make the cutting tool 2 pass through the rectangular reflection surface 105d of the upper rotary polygon mirror 105a in its longitudinal direction (the rotating direction of the optical deflector), i.e., in the direction along the surface parallel to the axis line of the bearing shaft 102 as the rotary shaft of the optical deflector as well as in the substantially rotating direction of the optical deflector (in the perpendicular direction from the front side of FIG. 4 to the depth side). Note that the expression "in the direction along the surface parallel to the axis line of the bearing shaft 102 as well as in the substantially rotating direction of the optical deflector" is not meant in a strict sense, but it means that a circular track of a cutting blade formed when the cutting tool 202 rotates about the rotary main shaft of the mirror-machining device is oriented substantially "in the direction in which the optical deflector rotates" at the cutting area of the reflection surface 105d. In other words, the axis line of the bearing shaft 102 is orthogonal to that of the rotary main shaft of the mirror-machining device, and it can be considered that the cutting tool 202 moves generally linearly at the cutting area, provided that the radius of rotation of the cutting tool 202 is comparatively larger than (e.g., about five to ten times) the length of the reflection surface 105d of the rotary polygon mirror 105a in its cutting direction. The rotary main shaft of the mirror-machining device is moved up and down in the axis-line direction of the bearing shaft 102 little by little for processing with the cutting tool 202, thereby performing mirror-machining on the entire reflection surface 105d.

If an interval between the rotary polygon mirrors 105a and 105b in the direction of the rotary shaft (the up-and-down direction in FIG. 4) is absent or too small in performing a cutting operation on the rotary polygon mirrors 105a and 105b as described above, there is a possibility that the cutting tool 202 of the mirror-machining device may come into contact with a corner portion of either the rotary polygon mirror 105a or the rotary polygon mirror 105b that is not being subjected to a cutting operation. More specifically, there is a possibility that the cutting tool 202 may come into contact with the corner portion of the lower rotary polygon mirror in performing a cutting operation on the upper reflection mirror 105d and that of the upper rotary polygon mirror in performing a cutting operation on the lower reflection mirror 105d. In this embodiment, the cylindrical joining section 105c is provided inside an inscribed circle of the reflection mirrors 105d between the rotary polygon mirrors 105a and 105b, and the thickness of the joining section 105c is adjusted to ensure a predetermined interval in the direction of the rotary shaft (the up-and-down direction), thereby making it possible to easily perform a cutting operation on the reflection surfaces 105d of the rotary polygon mirrors 105a and 105b where the rotary polygon mirrors 105a and 105b are integrated with each other in the mirror rotor 105. Note that if there is a possibility that the cutting tool 202 may come into contact with the holding section 105g for a similar reason, a joining section is preferably provided between the rotary polygon mirror 105b and the holding section 105g.

A fixation device 203 of the optical deflector has a rotation positioning mechanism (not shown) that fixes the mirror rotor 105 fixed on the bearing shaft 102 so as to process the reflection surfaces 105d of the rotary polygon mirrors 105a and 105b one by one. When the process of a first reflection surface is finished, the rotation positioning mechanism of the fixation device 203 rotates the rotary polygon mirror by a prescribed angle to start the process of a second reflection surface. If there are four reflection surfaces 105d, the cutting operation may be performed in such a manner that the four reflection surfaces of the rotary polygon mirror 105a are sequentially processed through the rotation of the mirror rotor 105 by 90 degrees for each and then the four reflection surfaces of the rotary polygon mirror 105b are processed. Furthermore, the cutting operation may be performed in such a manner that the reflection surfaces of the upper and lower rotary polygon mirrors 105a and 105b are alternately processed one by one through the rotation of the mirror rotor 105 by 45 degrees for each. The rotation positioning mechanism of the fixation device 203 can adjust a relative angle of the respective reflection mirrors of the rotary polygon mirror with high precision because of its high positioning angle precision of 1' (minute) or smaller.

The mirror rotor 105 is shrink-fitted on the bearing shaft 102, and the reflection surfaces 105d of the upper and lower rotary polygon mirrors 105a and 105d are shifted from each other by a prescribed angle (45 degrees in this embodiment) in the rotating direction. Accordingly, it is possible to prevent the rotary polygon mirror from being shifted from its initial fixed position to lose the balance of the rotating body due to applied heat stress or acceleration and deceleration movements by starting and stopping operations. As a result, increased vibrations and a shift in position of the rotating body in the deflecting direction will not be caused.

Note that it is possible to separately manufacture the holding section 105g for the rotor magnet 105 using a ferromagnetic material so as to improve magnetic use efficiency of the rotor magnet 106 and directly fix it to the rotary polygon mirrors 105a and 105b. However, it is suitable to manufacture the holding section 105g using the same material as the rotary polygon mirror of the mirror rotor 105 and form it into a cylindrical shape as an integrated component so as to prevent the rotary polygon mirrors 105a and 105b and the holding section 105g from being shifted from an initial fixed position to lose the balance of the rotating body due to applied heat stress or acceleration and deceleration movements by starting and stopping operations. As a result, increased vibrations of the rotating body will not be caused.

Furthermore, the joining section 105c formed into a cylindrical shape as described in this embodiment makes it possible to reduce the windage loss of the joining section and facilitates the process of forming the joining section 105c to reduce costs.

Moreover, since the outer diameter of the holding section 105g is larger than the diameter of the inscribed circle of the rotary polygon mirrors in this embodiment, the joining section is provided also between the rotary polygon mirror 105b and the holding section 105g so as to prevent the cutting tool from coming into contact with the holding section 105g for the rotor magnet 106 in performing the processing on the reflection mirrors 105d of the rotary polygon mirror 105b.

In this embodiment, a bearing mechanism is preferably a radial bearing as well as an oil retaining bearing having the bearing shaft 102 and a fixed sleeve 107, and a bearing gap is preferably 10 µm or smaller in diameter. The radial bearing is preferably provided with a dynamic pressure generation groove (not shown) to ensure the safety of the rotating body 101 at high-speed rotation. The dynamic pressure generation grove is provided in either the outer circumference surface of the bearing shaft 102 or the inner circumference surface of the fixed sleeve 107, but it is suitably provided in the inner circumference surface of the fixed sleeve 107 formed of a excellent workable sintered member. As a material of the bearing shaft 102, it is suitable to use martensitic stainless steel (for example, SUS420J2) having a high abrasion resistance, which is capable of being quenched to increase surface hardness.

The rotor magnet 106 is fixed at the lower part of the inner surface of the mirror rotor 105 and constitutes an outer-rotor type brushless motor together with a stator core 109 (winding coil 109a) fixed to a bearing housing 108. The rotor magnet 106 is preferably a bond magnet using a resin as a binder, and the outer diameter area of the rotor magnet 106 is held by the holding section 105g to prevent the breakage of the rotor magnet 106 due to centrifugal force at high-speed rotation. The rotor magnet 106 may be fixed to the holding section 105g by an adhesive. Alternatively, it may be press-fitted to the holding section 105g of the mirror rotor 105 using a material having substantially the same coefficient of linear expansion as the mirror rotor 105, thereby making it possible to precisely maintain the balance of the rotating body without causing a slight movement of the fixed portion even at further high-speed rotation and at high temperature.

The radial bearing includes a pivot bearing mechanism in which a thrust bearing 110 is brought into contact with the surface opposite to a convex curved surface 102a formed at the lower end surface of the bearing shaft 102. The forming of abrasion powder from the thrust bearing 110 is prevented in such a manner that a resin material or the like is used to provide an excellent lubricating property, or a hardening treatment such as DLC (diamond-like carbon) processing is applied to the front surface of martensitic stainless steel, ceramics, or a metal member. The fixed sleeve 107 and the thrust bearing 110 are located in the bearing housing 108, and a fluid seal 111 prevents the outflow of oil.

When the rotating body 101 is rotated at a high speed, for example, 25,000 rpm or faster, it is necessary to precisely maintain the balance of the rotating body 101 to reduce its vibrations. The rotating body 101 has two balance adjustment portions at its upper and lower positions, which correspond to concave portions 105e and 105f formed at the upper and lower positions of the mirror rotor 105. When the balance of the rotating body 101 is adjusted, an adhesive or the like is applied to part of the concave portions 105e and 105f. The amount of an adhesive or the like necessary for balancing the rotating body 101 is 10 mg or smaller, and it is preferably held at 1 mg or smaller, for example, at the portion having a diameter of 10 mm. Note that if it is difficult to control the rotating body 101 in performing the above-described slight adjustment as described above with an accretion such as an adhesive, or if an adhesive or the like is removed or scattered at the high-speed rotation of 40,000 rpm or faster because the amount of the adhesive or the like is small, it is suitable to perform a method of cutting a portion of the components of the rotating body (for example, cutting with a drill or laser processing).

The system of a motor in this embodiment is one called an outer-rotor type which has a magnetic gap in the diameter direction and has the rotor magnet 106 arranged at the outer diameter area of the stator core 109. The motor is driven to be rotated in such a manner that the signal, which is output from a Hall element 113 mounted on a circuit substrate 112 by a magnetic field of the rotor magnet 106, is referred to as a position signal and then the excitation of the winding coil 109a is switched by a driving IC 114. The rotor magnet 106 is magnetized in the diameter direction and produces a rotary torque with the outer circumference of the stator core 109 to rotate the motor. The magnetic path of the rotor magnet 106 in the outer diameter direction is opened, and the Hall element 113 for switching the excitation of the motor is arranged in the opened magnetic path. Reference numeral 115 denotes a connector to which a harness (not shown) is connected and by which power is supplied from the main body, activation of the motor is stopped, and control signals of rotational speed or the like are input/output.

Second Embodiment

Figure 5:
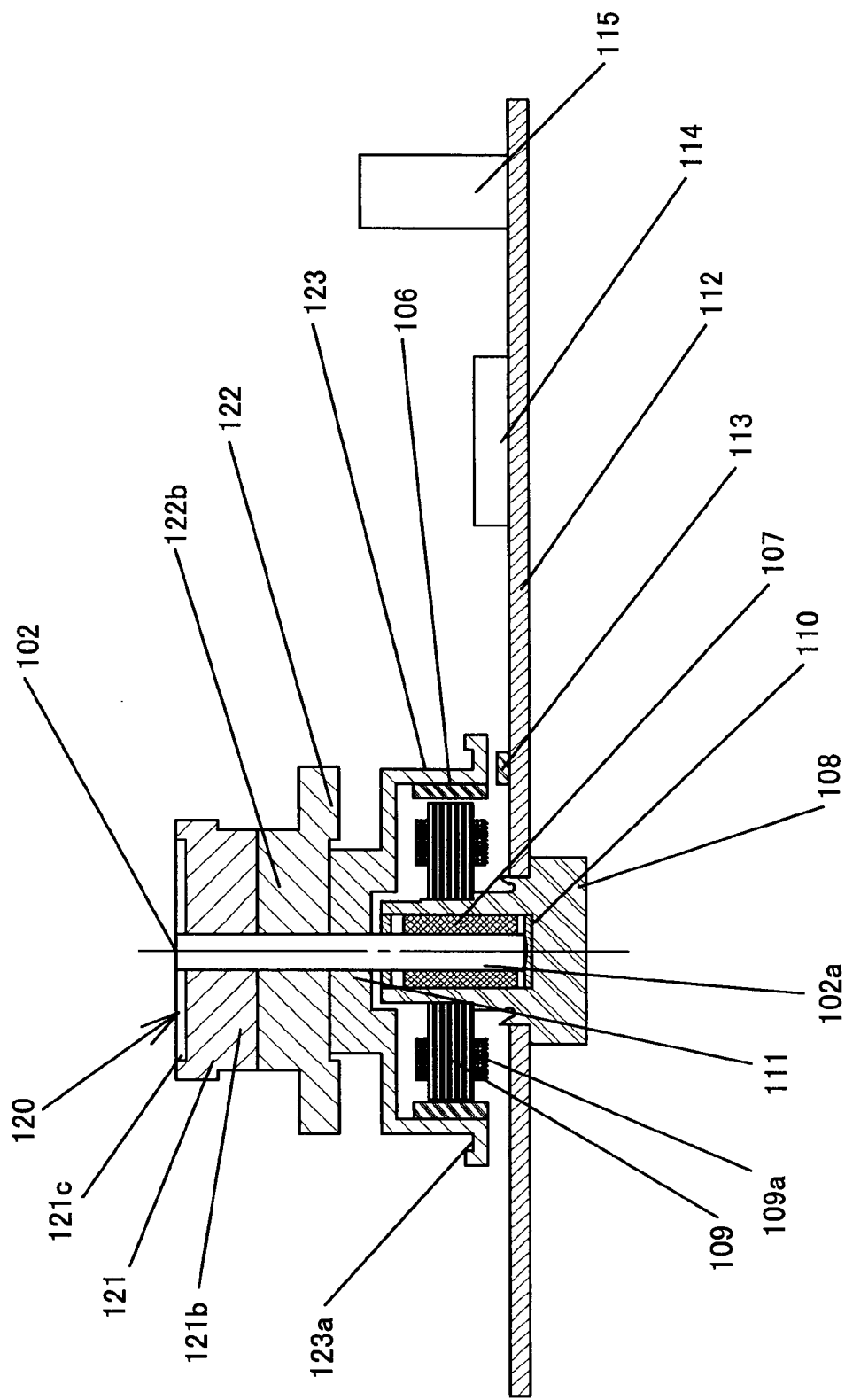
FIG. 5 is a cross-sectional view of an optical deflector according to a second embodiment of the present invention.
Figure 6:
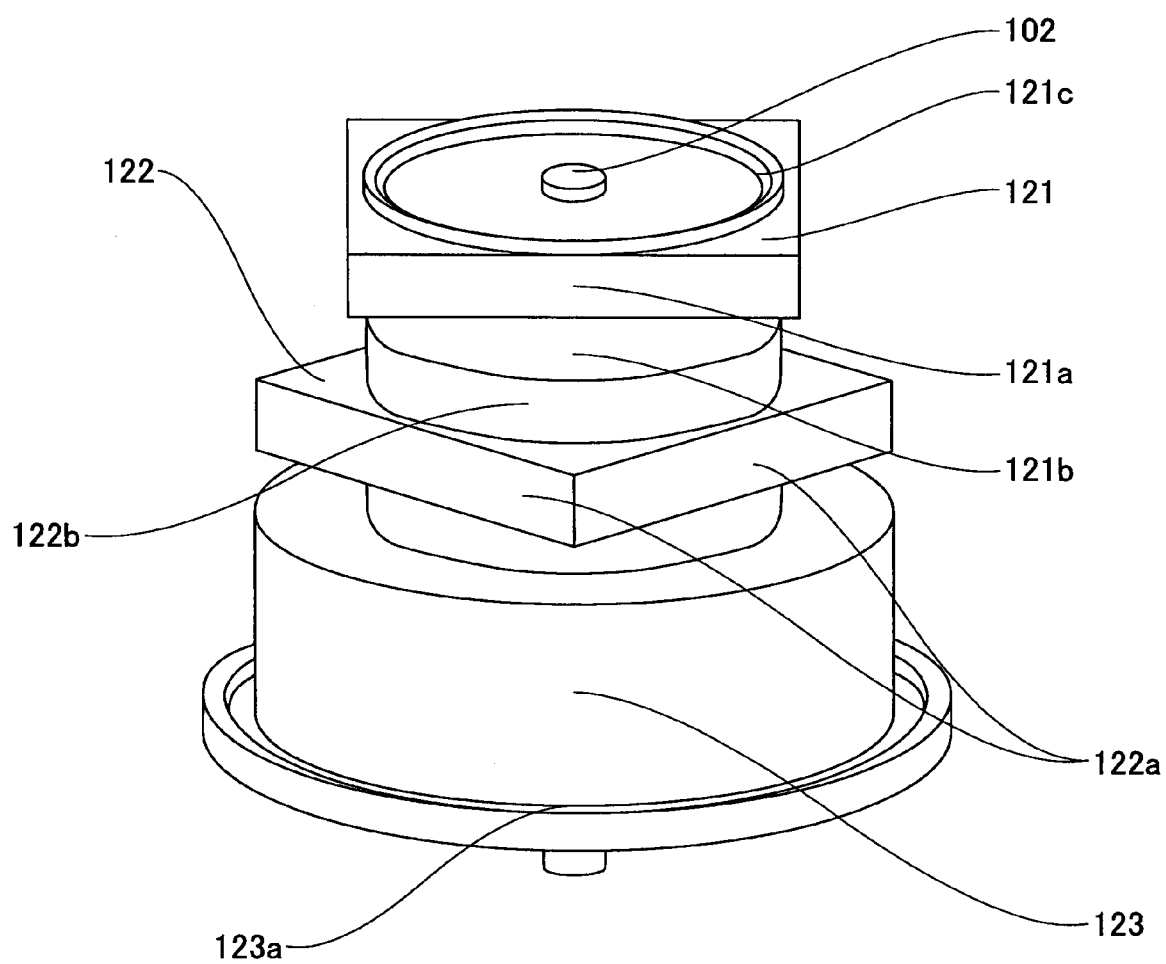
FIG. 6 is a perspective view of the optical deflector according to the second embodiment of the present invention.

A description is now made of the optical deflector of a second embodiment of the present invention. A rotating body corresponding to the mirror rotor 105 of the first embodiment may be composed of separately manufactured components as described below. FIGS. 5 and 6 show a cross-sectional view and a perspective view of the optical deflector of the second embodiment, respectively. Since the second embodiment is different from the first embodiment only in the configuration of the components of the rotating body 120, the description is made mainly of the components, and the components the same as those of the first embodiment are indicated by the same numerals and are not described below. The rotating body 120 of the optical deflector 100 includes the bearing shaft 102, rotary polygon mirrors 121 and 122, a holding section 123 for a rotor magnet, and the rotor magnet 106. The rotating body 120 has two balance adjustment portions at its upper and lower positions for high-speed rotation, and an adhesive or the like is applied to part of a concave portion 121c formed at the upper area of the rotary polygon mirror 121 and to that of a flange-shaped concave portion 123a formed at the circumference of the holding section 123, thereby making it possible to adjust the balance of the rotating body 120. In this embodiment, the rotary polygon mirrors 121 and 122 each having four reflection surfaces shifted from each other by 90 degrees in the rotating direction are laminated one on the other in the rotary shaft direction and fixed together with the reflection surfaces 121a and 122a of the rotary polygon mirrors 121 and 122 shifted from each other by 45 degrees in the rotating direction. The rotary polygon mirrors 121 and 122 have cylindrical joining sections 121b and 122b, respectively. Between the rotary polygon mirrors 121 and 122 are provided the joining section 121b and 122b as a predetermined interval to perform processing on the reflection surfaces 121a and 122a as in the first embodiment where the rotary polygon mirrors 121 and 122 are fitted on the bearing shaft 102 to be mutually fixed and integrated with each other. Accordingly, when mirror-machining is performed on the reflection surfaces 121*a* and 122*a* of the rotary polygon mirrors 121 and 122 after the assembling of the rotating body 120, it is possible to easily perform mirror-machining on the reflection surfaces 121*a* and 122*a* of the rotary polygon mirrors 121 and 122 without causing the cutting tool of the mirror-machining device to come into contact with a corner portion of the rotary polygon mirror.

In the rotating body 120, the rotary polygon mirrors 121 and 122 having the joining sections 121*b* and 122*b*, respectively, and the holding section 123 for the rotor magnet 106 are composed of separate components and independently shrink-fitted on the bearing shaft 102. It is preferable to use a jig when the rotary polygon mirrors 121 and 122 are shrink-fitted on the bearing shaft 102 so that they are fixed together with the reflection mirrors 121*a* and 122*a* precisely shifted from each other by 45 degrees in the rotating direction. With the configuration in which the rotary polygon mirrors 121 and 122 having the four reflection mirrors are laminated one on the other and shrink-fitted in the bearing shaft 102 to be integrated with each other, it is possible to prevent the rotary polygon mirror from being shifted from an initial fixed position to lose the balance of the rotating body due to applied heat stress or acceleration and deceleration movements by starting and stopping operations. As a result, increased vibrations and a shift in position of the rotating body in the optical deflecting direction will not be caused.

The joining sections 121*b* and 122*b* are separately provided in the rotary polygon mirrors 121 and 122, respectively, to thereby make it possible to have the structure of the rotary polygon mirrors 121 and 122 suitable for molding such as forge processing. As a result, it is possible to further reduce costs for manufacturing components compared with a case where a raw material is cut off to form a polygon shape. Moreover, the common use of the same component to make the rotary polygon mirrors 121 and 122 makes it possible to reduce costs.

As in the first embodiment, the rotary polygon mirrors 121 and 122 are preferably composed of a forged part formed of an aluminum-based metal material. Generally, the rotary polygon mirrors 121 and 122, the joining sections 121*b* and 122*b*, and the holding section 123 constituting the rotating body 120 are preferably manufactured using forged parts formed of an aluminum-based metal material. In addition, the same parts as the first embodiment, although not described in this embodiment, can be adopted as needed.

Third Embodiment

Figure 7:
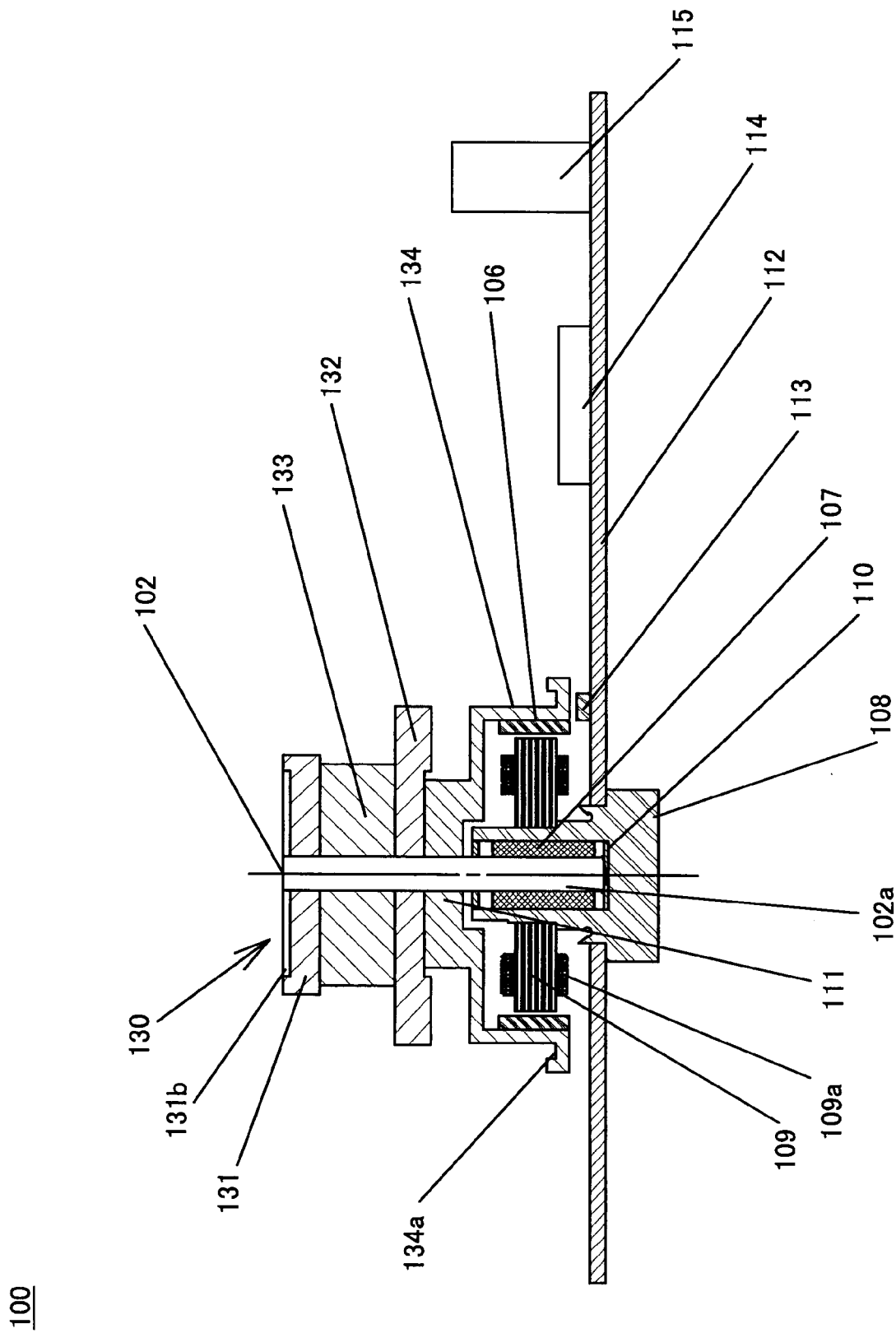
FIG. 7 is a cross-sectional view of an optical deflector according to a third embodiment of the present invention.
Figure 8:
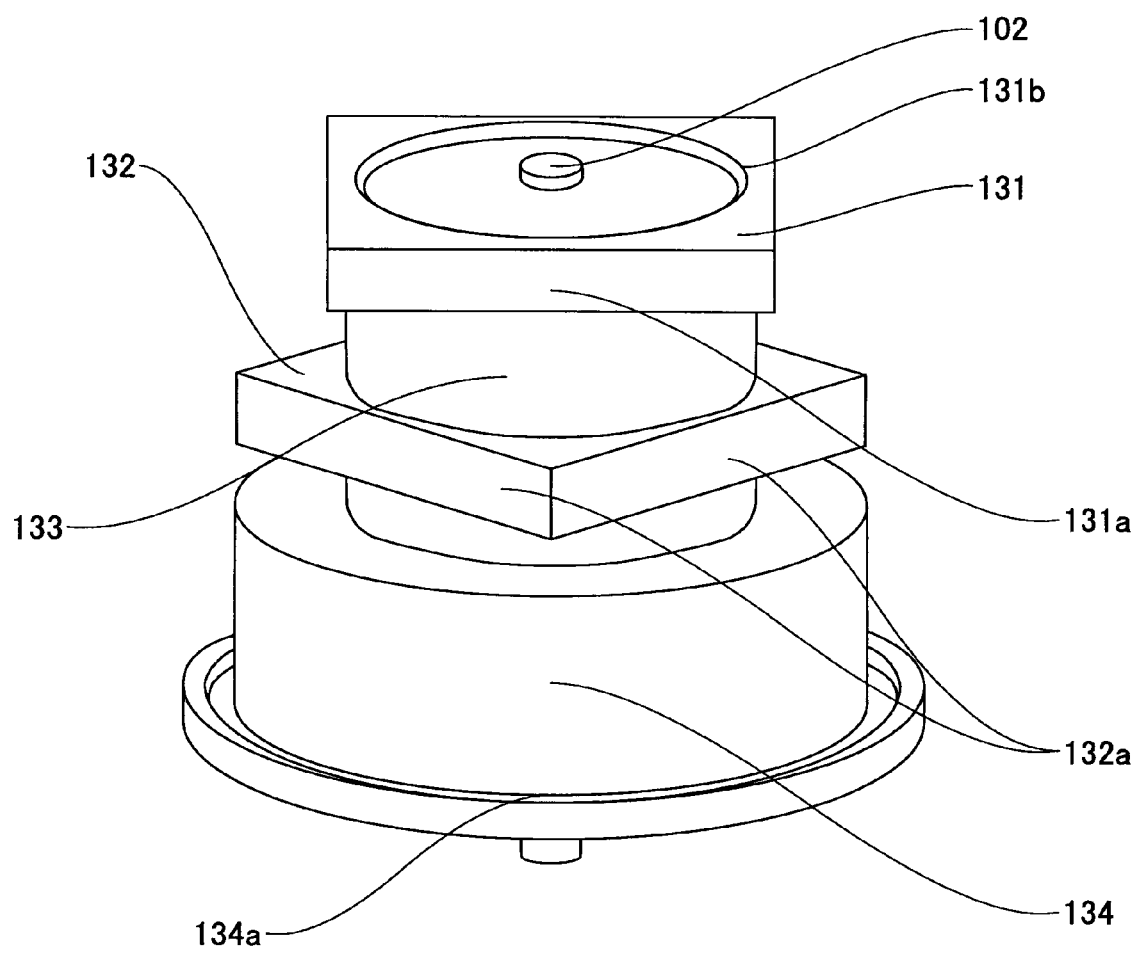
FIG. 8 is a perspective view of the optical deflector according to the third embodiment of the present invention.

A description is now made of the optical deflector of a third embodiment of the present invention. The rotary polygon mirrors 105*a* and 105*b*, the joining section 105*c*, and the holding section 105*g* of the first embodiment may be separate components as in the third embodiment below to constitute a main part of a rotating body 130. FIGS. 7 and 8 show a cross-sectional view and a perspective view, respectively, of the optical deflector 100 of the third embodiment. Since the third embodiment is different from the first embodiment only in the structure of the rotating body 130, the components the same as those of the first embodiment are indicated by the same numerals and not be described below. The rotating body 130 of the optical deflector 100 is composed of the bearing shaft 102, rotary polygon mirrors 131 and 132, a joining section 133 between the rotary polygon mirrors 131 and 132, a holding section 134 for the rotor magnet 106, and the rotor magnet 106. The rotating body 130 has two balance adjustment portions at its upper and lower positions for its high-speed rotation, and an adhesive or the like is applied to part of a concave portion 131*b* formed at the upper front surface of the rotary polygon mirror 131 and to that of a flange-shaped concave portion 134*a* formed at the circumference of the holding section 134, thereby making it possible to adjust the balance of the rotating body 130.

In the rotating body 130, the rotary polygon mirror 131, the joining section 133, the rotary polygon mirror 132, and the holding section 134 are shrink-fitted on the bearing shaft 102 to be laminated one on the other in descending order. Note that the rotary polygon mirrors 131 and 132 have four reflection surfaces shifted from each other by 90 degrees in the rotating direction and are arranged with their the reflection surfaces 131*a* and 132*a* of the rotary polygon mirrors 131 and 132 shifted from each other by 45 degrees in the rotating direction. It is preferable to use a jig when the rotary polygon mirrors 131 and 132 are shrink-fitted on the bearing shaft 102 so that they are precisely firmly fixed together with the reflection surfaces 131*a* and 132*a* shifted from each other by 45 degrees in the rotating direction. Note that although the holding section 134 includes the joining section in this embodiment, they may be separately formed.

As in the first and second embodiments, the joining section 133 and the holding section 134 as well as the rotary polygon mirrors 131 and 132 are preferably manufactured by a forged part formed of an aluminum-based metal material and shrink-fitted on the bearing shaft 102 to be fixed. Accordingly, it is possible to prevent the rotary polygon mirror from being shifted from an initial fixed position to lose the balance of the rotating body due to heat stress or acceleration and deceleration movements by starting and stopping operations at the high-speed rotation of the rotating body 130. As a result, noise and vibrations of the rotating body will not be caused.

Furthermore, as in the first and second embodiments, it is preferable to adjust the height of the cylindrical joining section 133 provided between the rotary polygon mirrors 131 and 132 to ensure a predetermined interval so that mirror-machining can be performed on the reflection surfaces 131*a* and 132*a* where the rotating body 130 is integrally formed. In this manner, it is possible to perform mirror-machining on the reflection surfaces 131*a* and 132*a* as in the first and second embodiments.

The rotary polygon mirrors 131 and 132 and the joining section 133 are composed of separate components and each component is made simple in shape, to thereby make it easy to forge each component and reduce costs for forming shapes.

Fourth Embodiment

Figure 9:
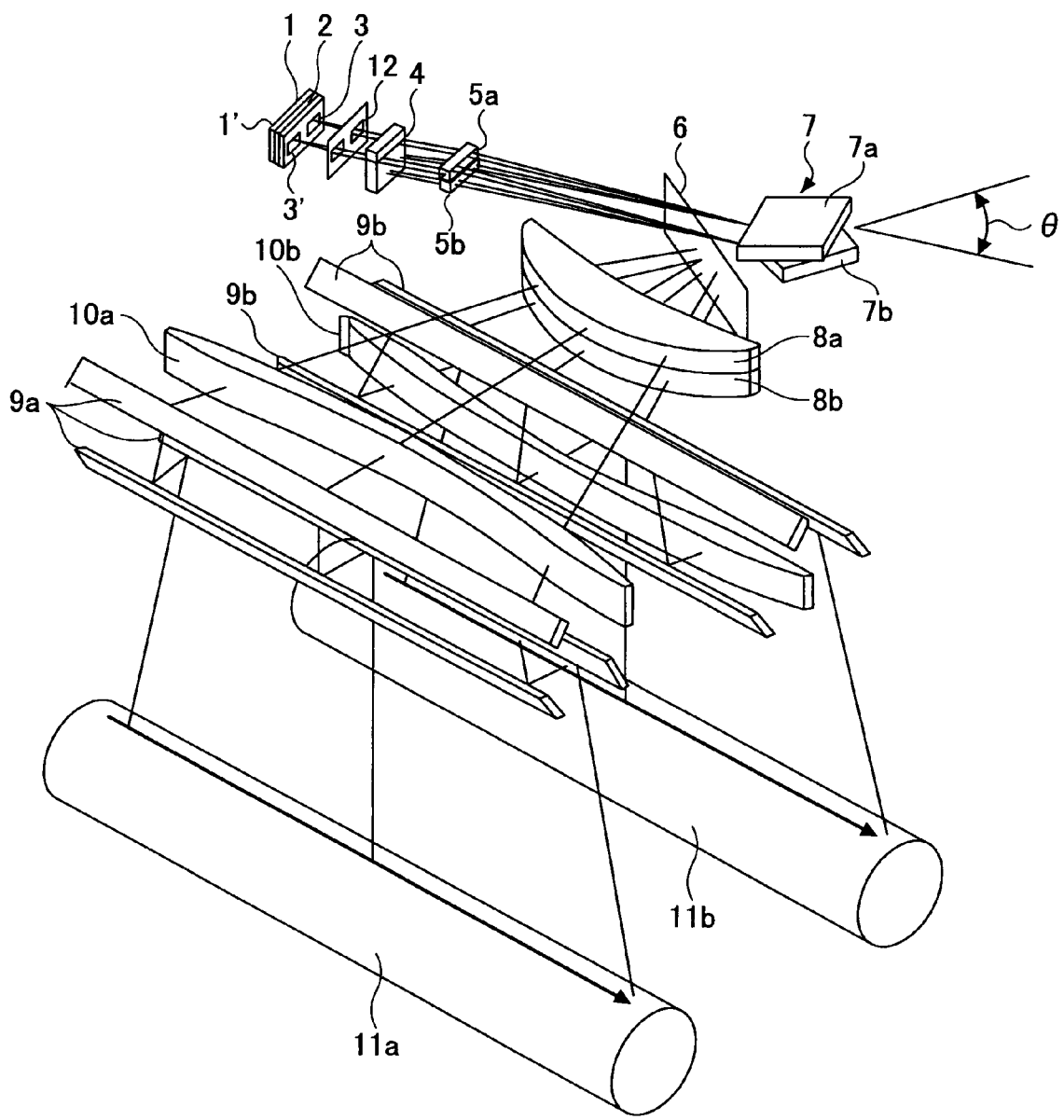
FIG. 9 is an illustration for describing the configuration of an optical scanning apparatus.

Referring next to FIGS. 9 through 12, a description is made of the optical scanning apparatus of a fourth embodiment into which the optical deflector of the embodiments of the present invention is assembled. FIG. 9 is an illustration for describing the configuration of the optical scanning apparatus 20 of the embodiment of the present invention. In FIG. 9, reference numerals 1 and 1' denote semiconductor lasers. The semiconductor lasers 1 and 1' in this embodiment are "two light emitting sources constituting one optical source," and each of the two light emitting sources emits one optical beam. The semiconductor lasers 1 and 1' are held in a predetermined positional relationship with a holder 2. Each of the optical beams emitted from the semiconductor lasers 1 and 1' is converted into a luminous flux form (a parallel luminous flux or a low divergent or low convergent luminous flux) suitable for an optical system by coupling lenses 3 and 3'. In this embodiment, the optical beams coupled by the coupling lenses 3 and 3' are parallel luminous fluxes. Each of the optical beams emitted from the coupling lenses 3 and 3' and formed into a desired luminous flux passes through an opening of an aperture which regulates the width of an optical beam and is "beam-shaped." Then, the optical beam is incident on a half-mirror prism 4 and divided into two in the sub-scanning direction by the action of the half-mirror prism 4 to form two optical beams.

Figure 10:
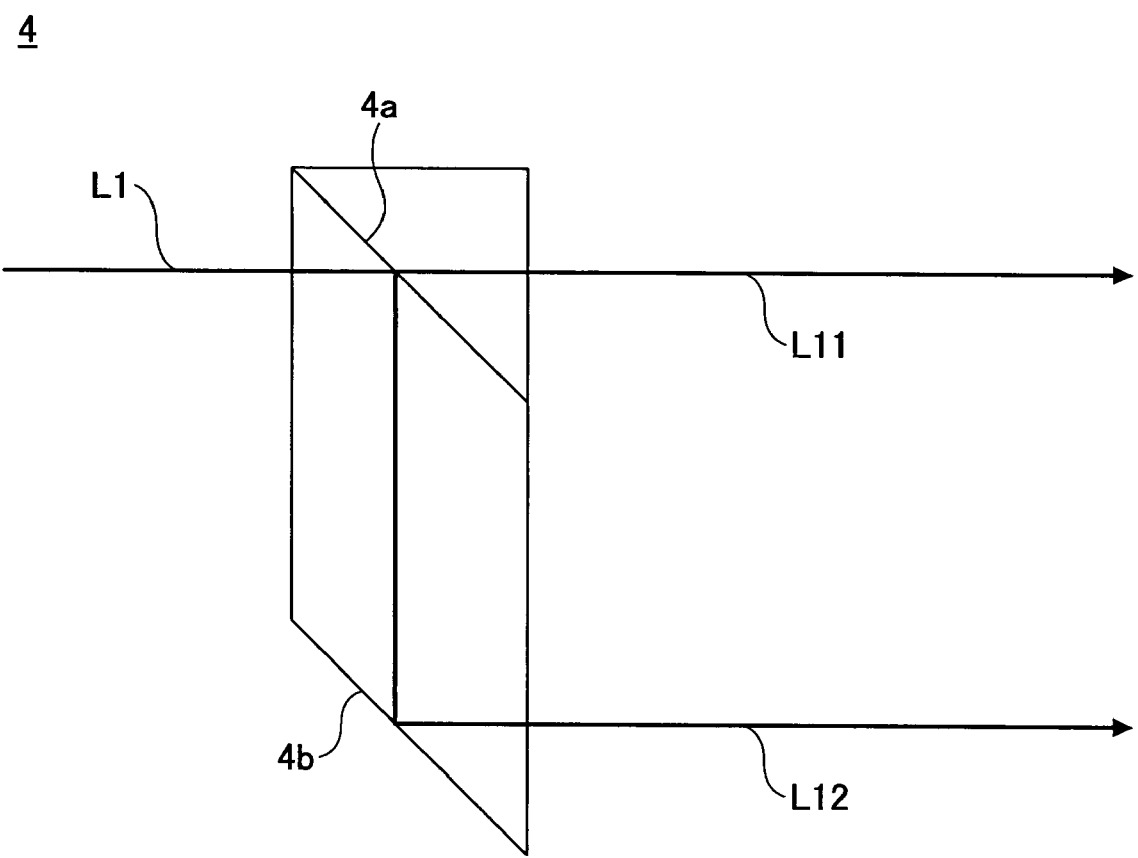
FIG. 10 is an illustration for describing means for dividing an optical beam into halves in the optical scanning apparatus.

FIG. 10 shows the operations of the half-mirror prism 4. The optical beam L1 emitted from the semiconductor laser 1 is exemplified for the sake of brevity. The up-and-down direction in FIG. 10 represents the sub-scanning direction, and the half-mirror prism 4 has a semi-transparent mirror 4a and a reflection surface 4b arranged parallel to each other in the sub-scanning direction. When the optical beam L1 is incident on the half-mirror prism 4, it is incident on the semi-transparent mirror 4a. At this time, part of the optical beam L1 passes straight through the semi-transparent mirror 4a so as to be some an optical beam L11, while the remaining part is reflected by the semi-transparent mirror 4a to be incident on the reflection surface 4b and then totally reflected by the reflection surface 4b so as to be some an optical beam L12. In this embodiment, the semi-transparent mirror 4a and the reflection surface 4b are parallel to each other. Therefore, the optical beams L11 and L12 emitted from the half-mirror prism 4 are parallel to each other. In this manner, the optical beam emitted from the semiconductor laser 1 is divided into two as the two optical beams L11 and L12 in the sub-scanning direction. The optical beam emitted from the semiconductor laser 1' is also divided into two in the same manner. As described above, the two optical beams are emitted from one optical source (m=1), and the two optical beams are divided into two (q=2) in the sub-scanning direction to form four optical beams in total.

Let us return to FIG. 9. The four optical beams are incident on cylindrical lenses 5a and 5b, condensed in the sub-scanning direction by the action of the cylindrical lenses 5a and 5b, and formed into images as "long linear images in the main scanning direction" near the reflection surface of the optical deflector 7 of the embodiments of the present invention including the rotary polygon mirrors. As shown in FIG. 9, out of the optical beams emitted from the semiconductor lasers 1 and 1' and then divided by the half-mirror prism 4, the optical beam (the optical beam L11 of FIG. 10), which passes straight through the semi-transparent mirror 4a of the half-mirror prism 4, is incident on the cylindrical lens 5a, while the optical beam (the optical beam L12 of FIG. 10), which is reflected by the semi-transparent mirror 4a and then further reflected by the reflection mirror 4b, is incident on the cylindrical lens 5b.

In FIG. 9, reference numeral 6 denotes a "soundproof glass" provided in the window of the soundproof housing of the optical deflector 7. The four optical beams from the optical sources are incident on the optical deflector 7 through the soundproof glass 6, and the optical beams deflected by the rotary polygon mirrors are emitted to the side of a scanning imaging optical system through the soundproof glass 6. The optical deflector 7 has an upper polygon mirror 7a (rotary polygon mirror) and a lower polygon mirror 7b (rotary polygon mirror) laminated one on the other in the rotary shaft direction and is rotated about the rotary shaft by a drive motor (not shown). Although the upper and lower polygon mirrors 7a and 7b are rotary polygon mirrors the same in shape having "four reflection surfaces" in this embodiment, the reflection surfaces of the lower polygon mirror 7b are shifted from those of the upper polygon mirror 7a by a prescribed angle θ (45 degrees in this embodiment) in the rotating direction.

In FIG. 9, reference numerals 8a and 8b, 10a and 10b, and 9a and 9b denote "first scanning lenses," "second scanning lenses," and "optical-path bending mirrors," respectively. Furthermore, reference numerals 11a and 11b denote "photoconductive photoreceptors." The first scanning lens 8a, the second scanning lens 10a, and the optical-path bending mirror 9a guide the two optical beams (the two optical beams which are emitted from the semiconductor lasers 1 and 1' and pass through the semi-transparent mirror 4a of the half-mirror prism 4) deflected by the upper polygon mirror 7a of the polygon-mirror-type optical deflector 7 onto the photoconductive photoreceptor 11a as a corresponding optical scanning position to constitute a pair of scanning imaging optical systems forming two optical spots separated in the sub-scanning direction.

The first scanning lens 8b, the second scanning lens 10b, and the optical-path bending mirror 9b guide the two optical beams (the two optical beams which are emitted from the semiconductor lasers 1 and 1' and reflected by the semi-transparent mirror 4a of the half-mirror prism 4) deflected by the lower polygon mirror 7b of the polygon-mirror-type optical deflector 7 onto the photoconductive photoreceptor 11b as a corresponding optical scanning position to constitute a pair of scanning imaging optical systems forming two optical spots separated in the sub-scanning direction.

The optical positions of the optical beams emitted from the semiconductor lasers 1 and 1' are determined such that "principal rays are crossed each other near the position of the reflection surface" when viewed from the rotary shaft direction of the optical deflector 7. Thus, in each pair of two luminous fluxes incident on the reflection surface, the optical beam mutually has an "opening angle (formed by the projection of the two optical beams onto the surface orthogonal to the rotary shaft when the optical sources are seen from the deflection reflective surface)." With the "opening angle," the two optical spots formed in the photoconductive photoreceptor 11a and 11b, respectively, are separated also in the main-scanning direction. Therefore, individual detection of the two optical beams that optically scan each of the photoconductive photoreceptors makes it possible to synchronize the start for an optical scanning for each optical beam.

In this manner, multi-beam scanning is performed on the photoconductive photoreceptors 11a and 11b by the two optical beams deflected by the upper and lower polygon mirrors 7a and 7b of the polygon-mirror-type optical deflector 7, respectively. Since the deflection reflective surfaces of the upper and lower polygon mirrors 7a and 7b of the polygon-mirror-type optical deflector 7 are shifted from each other by 45 degrees in the rotating direction, the optical beams deflected by the lower polygon mirror 7b are not guided to the photoconductive photoreceptor 11b when the optical beams deflected by the upper polygon mirror 7a optically scan the photoconductive photoreceptor 11a, and the optical beams deflected by the upper polygon mirror 7a are not guided to the photoconductive photoreceptor 11a when the optical beams deflected by the lower polygon mirror 7a optically scan the photoconductive photoreceptor 11b. In other words, the optical scanning of the photoconductive photoreceptors 11a and 11b are "alternately performed with a time difference."

Figure 11A:
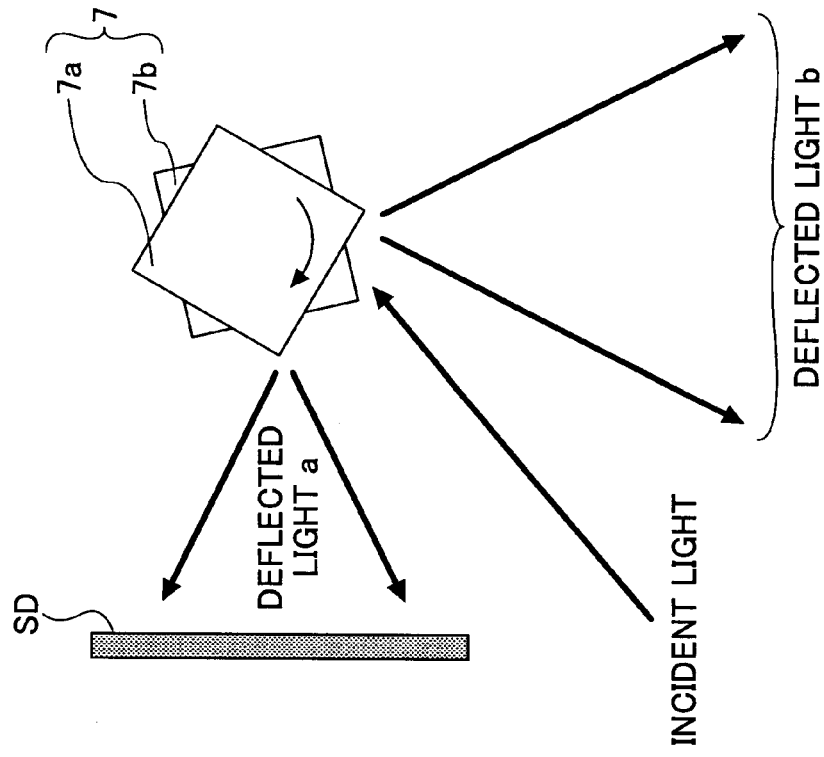
FIGS. 11A and 11B are illustrations for describing a case in which optical beams are deflected for scanning in the optical scanning apparatus.
Figure 11B:
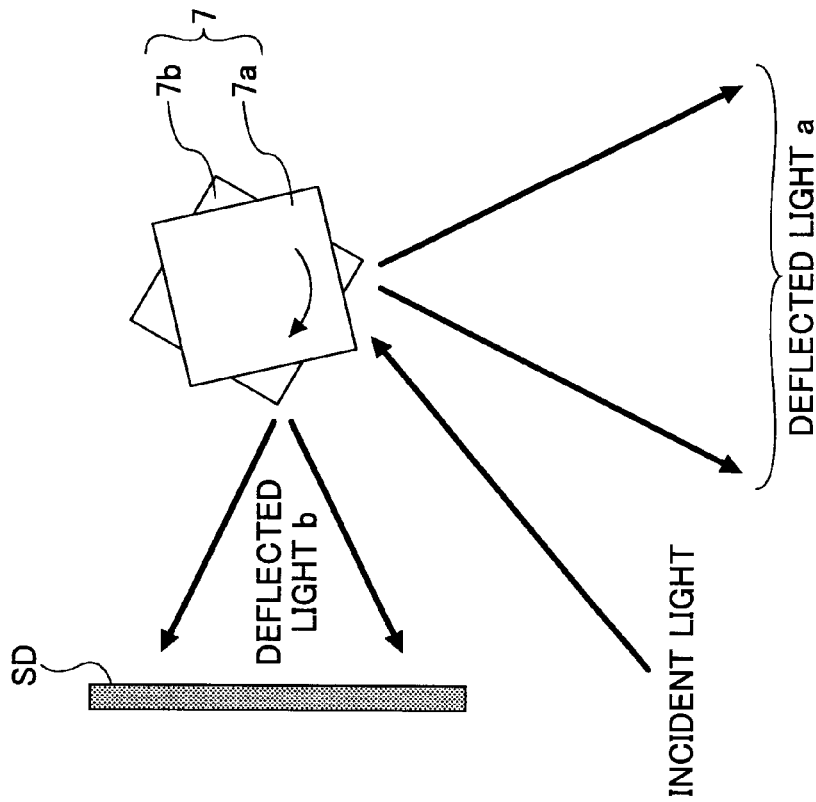

FIGS. 11A and 11B are illustrations for describing the above operations. For simplicity, an optical beam (actually, four beams) incident on the optical deflector 7 and deflected optical beams are shown as an "incident light" and "deflected lights a and b," respectively. FIG. 11A shows a situation in which the incident light is incident on the optical deflector 7 and the "deflected lights a" reflected and deflected by the upper polygon mirror 7a are guided to an optical scanning position. At this time, the "deflected lights b" by the lower polygon mirror 7*b* are not oriented to the optical scanning position. FIG. 11B shows a situation in which the "deflected lights b" reflected and deflected by the lower polygon mirror 7*b* are guided to the optical scanning position. At this time, the "deflected light a" by the upper polygon mirror 7*a* is not oriented to the optical scanning position. Note that the deflected lights not guided to the optical scanning position are preferably shielded with a light shielding unit SD as shown in FIGS. 11A and 11B so that the deflected lights by one polygon mirror do not function as "ghost lights" while the deflected lights by the other polygon mirror are guided to the optical scanning position. Actually, this can easily be achieved by an inner wall of the above "soundproof housing" having a non-reflection surface.

As described above, the (multi-beam system) optical scanning of the photoconductive photoreceptors 11*a* and 11*b* is alternately performed in the embodiment shown in FIG. 9. Accordingly, if the light emitting intensity of the optical source is modulated by "the image signal of black images" and "the image signal of magenta images" for performing the optical scanning of the photoconductive photoreceptors 11*a* and 11*b*, respectively, it is possible to write electrostatic latent images of the black and magenta images in the photoconductive photoreceptors 11*a* and 11*b*, respectively.

Figure 12:
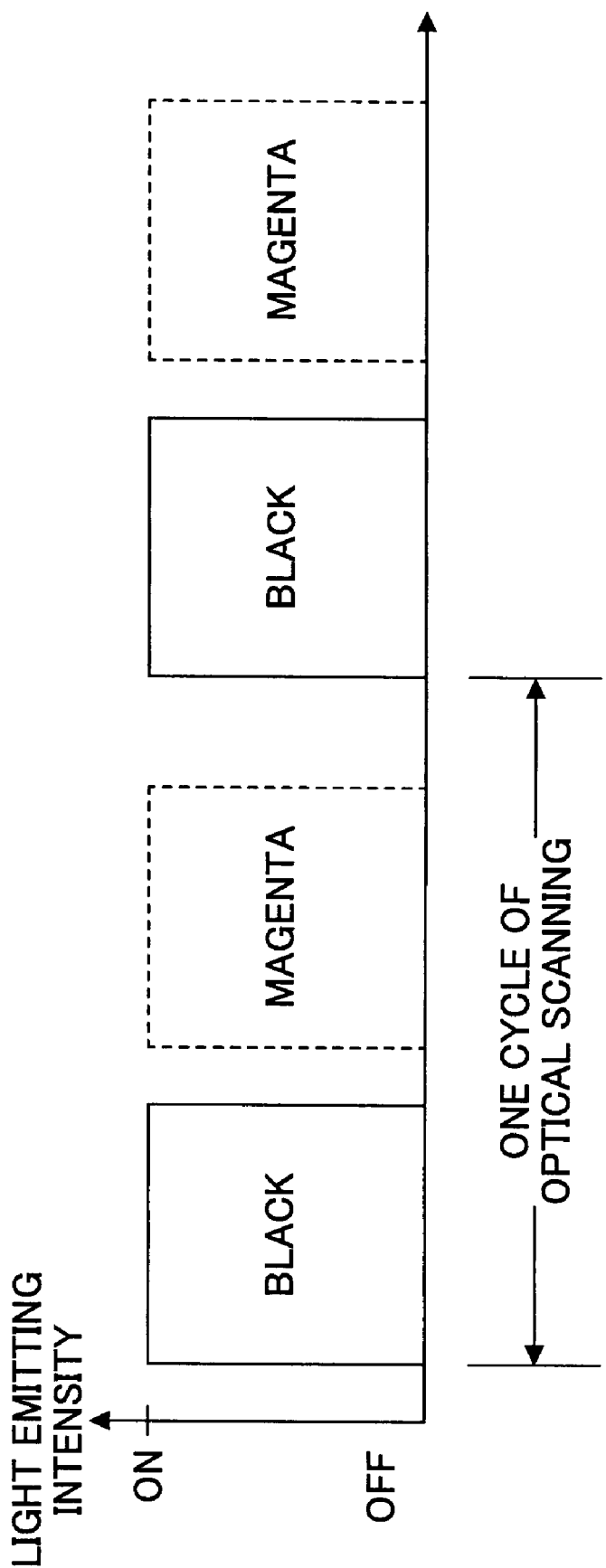
FIG. 12 is a diagram for describing scanning timing of an optical beam in the optical scanning apparatus.

FIG. 12 shows a time chart "for full lighting in an effective scanning region" with "common optical sources (the semiconductor lasers 1 and 1' of FIG. 9)" when the black and magenta images are written. Solid lines and dashed lines indicate parts corresponding to the writing of the black and magenta images, respectively. A timing of writing the black and magenta images is determined in such a manner that the optical beam being oriented to an optical scanning start position is detected by a synchronous light receiving unit (not shown in FIG. 9, but it is generally a photodiode) provided outside the effective scanning region.

In the optical scanning apparatus 20 of the fourth embodiment, the optical deflectors of the first through third embodiments are suitably used as the optical deflector 7. The optical scanning apparatus of the fourth embodiment can provide the multi-beam optical scanning apparatus which reduces vibrations caused by the high-speed rotation of the optical deflector, reduces noise, provides high image quality, reduces the number of components and materials for the optical source portion to decrease impacts on the environment, and reduces the failure probability of the optical source.

Fifth Embodiment

Figure 13:
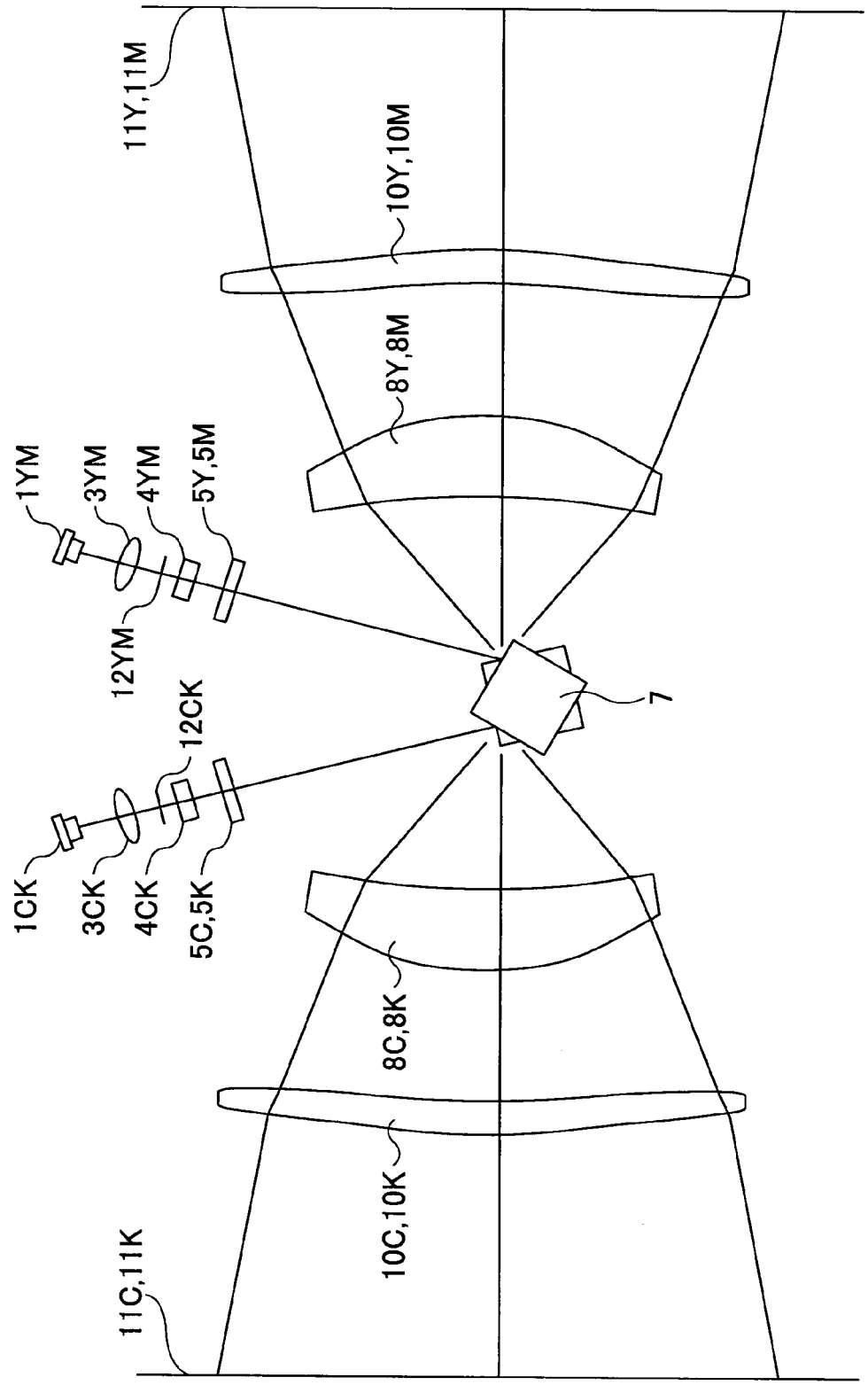
FIG. 13 is a conceptual diagram of the optical scanning apparatus used in an image forming apparatus.
Figure 14:
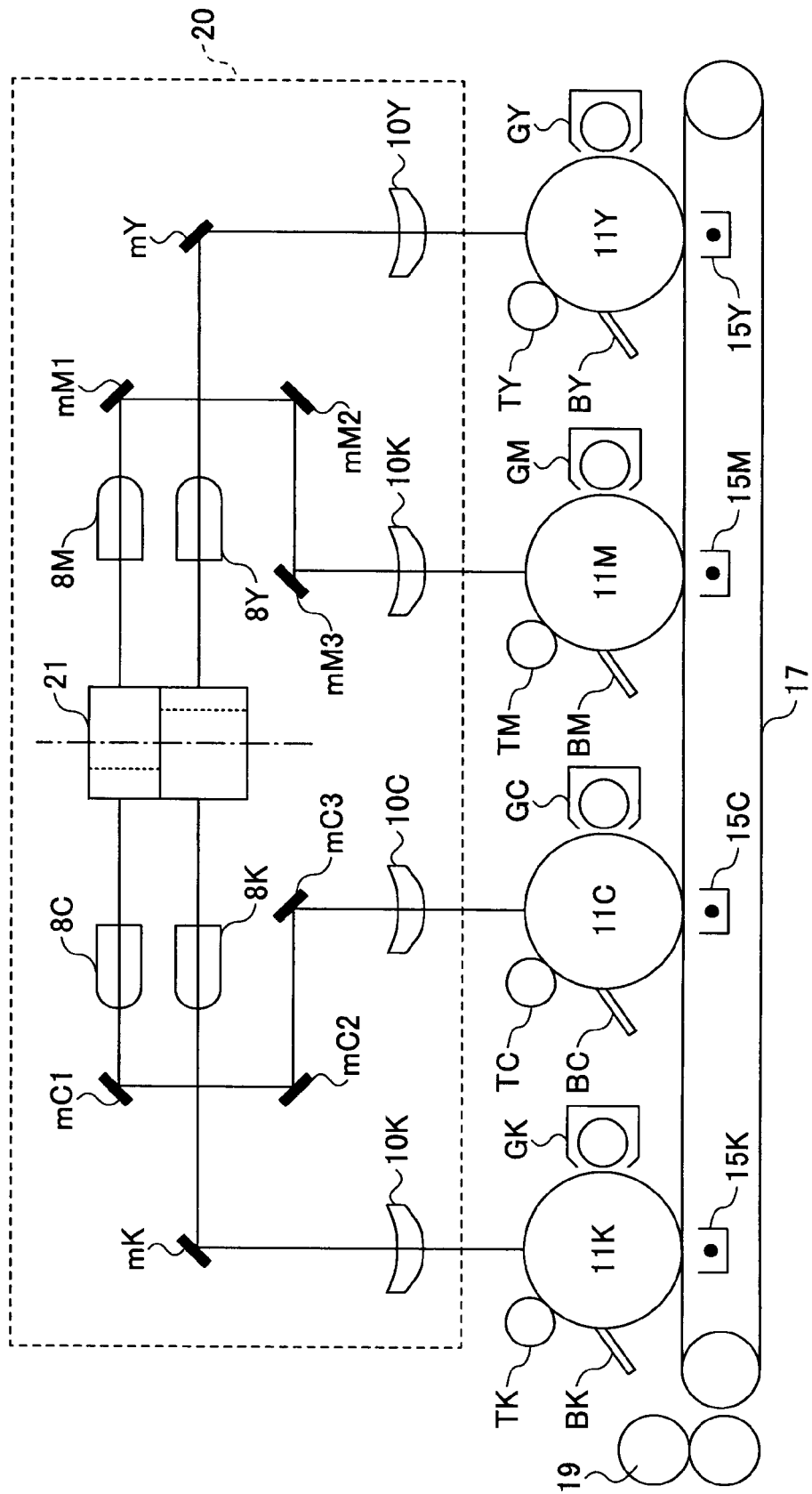
FIG. 14 is a diagram showing the configuration of the image forming apparatus.

Next, referring to FIGS. 13 and 14, a description is made of a fifth embodiment as an example of the image forming apparatus according to the present invention. FIG. 13 shows the optical system portion of the optical scanning apparatus in the fifth embodiment when viewed from the sub-scanning direction, i.e., the rotary shaft direction of the optical deflector 7. For simplicity of the drawing, the optical-path bending mirror on the optical path ranging from the optical deflector 7 to an optical scanning position is omitted, and the optical path is drawn as a straight line. The optical scanning apparatus shows a case in which "m=q=2," "p (optical source)=1," and "n (optical beam)=4" and optically scans four optical scanning positions with one optical beam for each. Furthermore, photoconductive photoreceptors 11Y, 11M, 11C, and 11K are arranged at the image forming position for optical scanning, and the electrostatic latent images formed on the four photoconductive photoreceptors are individually visualized by corresponding toners of magenta, yellow, cyan, and black to form color images.

In FIG. 13, reference numerals 1YM and 1CK denote semiconductor lasers. Each of the semiconductor lasers 1YM and 1CK emit one optical beam. The intensity of the semiconductor laser 1YM is alternately modulated by "the image signal corresponding to yellow images" and "the image signal corresponding to magenta images." The intensity of the semiconductor laser 1CK is alternately modulated by "the image signal corresponding to cyan images" and "the image signal corresponding to black images." The optical beam emitted from the semiconductor laser 1YM is formed into a parallel luminous flux by a coupling lens 3YM and passes through an aperture 12YM to be beam-shaped. Then, the optical beam is incident on a half-mirror prism 4YM and divided into two optical beams separated in the sub-scanning direction. The half-mirror prism 4YM is the same as the half-mirror prism 4 used for describing FIG. 10. Out of the divided optical beams, one is used for writing yellow images, while the other is used for writing magenta images. The two optical beams divided in the sub-scanning direction are condensed in the sub-scanning direction by cylindrical lenses 5Y and 5M (arranged so as to overlap each other in the sub-scanning direction) arranged in the sub-scanning direction and then incident on the optical deflector 7. The optical deflector 7 is the same as the ones used for describing FIGS. 9 and 11 and has polygon mirrors each having four deflection reflective surfaces laminated one on the other in the rotary shaft direction. The polygon mirrors are integrally formed together with the mutual reflection surfaces of the polygon mirrors shifted from each other in the rotating direction. The long line images in the main-scanning direction by the cylindrical lenses 5Y and 5M are formed into images near the deflection reflective surfaces of the polygon mirrors. The optical beams deflected by the polygon-mirror-type optical deflector 7 pass through first scanning lenses 8Y and 8M and second scanning lenses 10Y and 10M, respectively, to form optical spots on the photoconductive photoreceptors 11Y and 11M by the action of these lenses, and optically scan the photoconductive photoreceptors as the optical scanning positions.

Similarly, the optical beam emitted from the semiconductor laser 1CK is formed into a parallel luminous flux by a coupling lens 3CK and passes through an aperture 12CK to be beam-shaped. Then, the optical beam is divided into two optical beams separated in the sub-scanning direction by a half-mirror prism 4CK. The half-mirror prism 4CK is the same as the half-mirror prism 4YM. Out of the divided optical beams, one is used for writing cyan images, while the other is used for writing black images. The two optical beams divided in the sub-scanning direction are condensed in the sub-scanning direction by cylindrical lenses 5C and 5K (arranged so as to overlap each other in the sub-scanning direction) arranged in the sub-scanning direction and then incident on the polygon-mirror-type optical deflector 7 to be deflected. The two deflected optical beams pass through first scanning lenses 8C and 8K and second scanning lenses 10C and 10K, respectively, to form optical spots on the photoconductive photoreceptors 11C and 11K by the action of these lenses, and optically scan the photoconductive photoreceptors as the optical scanning positions.

The part denoted by reference numeral 20 in FIG. 14 is the optical scanning apparatus, which is used to describe FIG. 13. Since reference numeral 21 integrally represents a unit including an optical beam emitting unit and an optical deflector as a whole, it may denote the optical deflector in some cases. As shown in FIG. 14, one of the optical beams deflected by the upper polygon mirror of the optical deflector 21 is guided to the photoconductive photoreceptor 11M serving as the substance of the optical scanning position through the optical path bended by optical-path bending mirrors mM1, mM2, and mM3, while the other is guided to the photoconductive photoreceptor 11C serving as the substance of the optical scanning position through the optical path bended by optical-path bending mirrors mC1, mC2, and mC3. Furthermore, one of the optical beams deflected by the lower polygon mirror of the polygon-mirror-type optical deflector 21 is guided to the photoconductive photoreceptor 11Y serving as the substance of the optical scanning position through the optical path bended by an optical-path bending mirror mY, while the other is guided to the photoconductive photoreceptor 11K serving as the substance of the optical scanning position through the optical path bended by an optical-path bending mirror mK.

Accordingly, the optical beams from the semiconductor lasers 1YM and 1CK (m=2) are each divided into two optical beams by the half-mirror prisms 4YM and 4CK to form four optical beams, and the four optical beams optically scan the four photoconductive photoreceptors 11Y, 11M, 11C, and 11K. The photoconductive photoreceptors 11Y and 11M are alternately optically scanned by the optical beams formed by dividing the optical beam from the semiconductor laser 1YM into halves, respectively, as the optical deflector 21 rotates, while the photoconductive photoreceptors 11C and 11K are alternately optically scanned by the optical beams formed by dividing the optical beam from the semiconductor laser 1CK into halves, respectively, as the optical deflector 7 rotates. The photoconductive photoreceptors 11Y through 11K are rotated clockwise at a constant speed, uniformly charged with corresponding charging rollers TY, TM, TC, and TK as charging units, and optically scanned by the corresponding optical beams. As a result, respective color images in yellow, magenta, cyan, and black are written in the photoconductive photoreceptors 11Y through 11K, respectively, to form corresponding electrostatic latent images (negative latent images). The electrostatic latent images are reversal-developed by development apparatuses GY, GM, GC, and GK, and yellow, magenta, cyan, and black toner images are thus formed on the photoconductive photoreceptors 11Y, 11M, 11C, and 11K, respectively. The toner images of the respective colors are transferred onto a "transfer sheet" (not shown). More specifically, the transfer sheet is conveyed by a conveyance belt 17, a transfer unit 15Y transfers a yellow toner image to the transfer sheet from the photoconductive photoreceptor 11Y, and then transfer units 15M, 15C, and 15K sequentially transfer magenta, cyan, and black toner images to the transfer sheet from the photoconductive photoreceptor 11M, 11C, and 11K, respectively. In this manner, the yellow, magenta, cyan, and black toner images are superposed on the transfer sheet to synthetically constitute a full color image. The full color image is fixed on the transfer sheet by a fixing unit 19 to provide a finished color image.

More specifically, the fifth embodiment shown in FIGS. 13 and 14 provides the tandem-type image forming apparatus that optically scans plural photoconductive photoreceptors to have electrostatic latent images individually formed thereon, visualizes the electrostatic latent images to form toner images, and transfers the obtained toner images on the same sheet-like recording medium to synthetically form images. In this image forming apparatus, there are four photoconductive photoreceptors, and the optical scanning apparatus is configured to optically scan the photoconductive photoreceptors to which two optical beams from the respective optical sources are guided using the two optical sources 1YM and 1CK and individually visualizes the electrostatic latent images formed on the four photoconductive photoreceptor 11M, 11Y, 11C, and 11K with the toners of yellow, magenta, cyan, and black, respectively, to form color images.

In the image forming apparatus of the fifth embodiment, the optical scanning apparatus of the fourth embodiment of the present invention is suitably used. The image forming apparatus of the fifth embodiment can reduce vibrations caused by the rotation of an optical deflector, reduce noise, provide high image quality, reduce the number of components and materials for an optical source portion to decrease the impact on the environment, and reduce the failure probability of the optical source. Note that although the respective photoconductive photoreceptors are optically scanned by a "single-beam system" in the embodiments of the image forming apparatus, they may be, of course, optically scanned by a "multi-beam system" with the structure of the optical sources modified as in FIG. 9.

Although the embodiments of the present invention are specifically described, the present invention is not limited to the above embodiments, and variations and modifications may be made without departing from the scope of the present invention.

The present application is based on Japanese Priority Patent Application No. 2006-250048, filed on Sep. 14, 2006, the entire contents of which are hereby incorporated by reference.

What is claimed is:

1. An optical deflector, comprising:
   a rotary shaft;
   plural rotary polygon mirrors laminated in an axis direction of the rotary shaft, the plural rotary polygon mirrors having reflection surfaces, the plural rotary polygon mirrors including a first rotary polygon mirror and a second rotary polygon mirror, and each of the reflection surfaces of the first rotary polygon mirror and the second rotary polygon mirror facing a different direction; and
   a joining section provided in an interval in a direction of the rotary shaft between the plural rotary polygon mirrors,
   wherein the joining section is integrally formed with at least one of the plural rotary polygon mirrors.

2. The optical deflector according to claim 1,
   wherein the reflection surfaces are formed by mirror-machining after the rotary shaft and the plural rotary polygon mirrors are integrated with each other.

3. The optical deflector according to claim 1, wherein the plural rotary polygon mirrors are forged products.

4. The optical deflector according to claim 1, wherein the plural rotary polygon mirrors are shrink-fitted on the rotary shaft.

5. An optical deflector, comprising:
   a rotary shaft;
   plural rotary polygon mirrors having reflection surfaces, the plural rotary polygon mirrors including a first rotary polygon mirror and a second rotary polygon mirror, and each of the reflection surfaces of the first rotary polygon mirror and the second rotary polygon mirror facing a different direction; and
   a joining section provided in an interval in a direction of the rotary shaft between the plural rotary polygon mirrors,
   wherein the plural rotary polygon mirrors and the joining section are formed as an integrated rotating body and fixed to the rotary shaft.

6. The optical deflector according to claim 1, wherein the rotary shaft includes a rotor-magnet holding section in which a rotor magnet is arranged.

7. The optical deflector according to claim 1, wherein the joining section has an axis parallel to the rotary shaft, an outer diameter of the joining section is smaller than or equal to a diameter of an inscribed circle with respect to a shape of a cross section of each of the plural rotary polygon mirrors, and the cross section of each of the plural rotary polygon mirrors are perpendicular to the rotary shaft.

8. An image forming apparatus to optically scan a photosensitive surface of a photoreceptor with an optical scanning apparatus to produce a latent image formed thereon and visualizing the latent image to form an image, wherein the photosensitive surface of the photoreceptor is optically scanned to form the latent image with the optical scanning apparatus, the optical scanning apparatus comprising:

an optical-beam emitting unit;

the optical deflector according to claim 1;

a dividing optical system configured to divide an optical beam emitted from the optical-beam emitting unit into plural optical beams to be incident on the plural rotary polygon mirrors of the optical deflector, the optical beams being reflected as reflected lights from the plural rotary polygon mirrors; and a scanning optical system configured to form the plural reflected lights reflected from the rotary polygon mirrors into images on plural of the photoreceptors.

9. An optical deflector according to claim 1, wherein the joining section has a shape of a cylinder having an axis parallel to the rotary shaft.

10. An optical deflector according to claim 1, wherein the joining section is made of an aluminum-based metal material.

11. An optical deflector according to claim 5, wherein the joining section has a shape of a cylinder having an axis parallel to the rotary shaft.

12. An optical deflector according to claim 5, wherein the joining section is made of an aluminum-based metal material.

* * * * *